US008469699B2

(12) United States Patent
Leroux et al.

(10) Patent No.: US 8,469,699 B2

(45) Date of Patent: Jun. 25, 2013

(54) STAGED COMBUSTION METHOD FOR PRODUCING ASYMMETRIC FLAMES

(75) Inventors: Bertrand Leroux, Issy les Moulineaux (FR); Rémi Tsiava, Saint Germain les Corbeil (FR); Patrick Jean-Marie Recourt, Marcoussis (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 889 days.

(21) Appl. No.: 11/813,292

(22) PCT Filed: Dec. 20, 2005

(86) PCT No.: PCT/FR2005/051118

§ 371 (c)(1), (2), (4) Date: Dec. 2, 2009

(87) PCT Pub. No.: WO2006/072724

PCT Pub. Date: Jul. 13, 2006

(65) Prior Publication Data

US 2010/0068665 A1 Mar. 18, 2010

(30) Foreign Application Priority Data

Jan. 3, 2005 (FR) ..................................... 05 50010

(51) Int. Cl.
*F23C 5/00* (2006.01)

(52) U.S. Cl.
USPC .................. 431/8; 431/10; 431/12; 431/164; 431/165

(58) Field of Classification Search
USPC ............................ 431/8, 10; 432/12; 110/236
See application file for complete search history.

(56) References Cited

U.S. PATENT DOCUMENTS 2,310,704 A * 2/1943 Mulholland .................. 239/423
2,947,289 A * 8/1960 Miller ........................ 122/479.1
3,063,431 A * 11/1962 Miller ........................... 122/478
3,110,291 A * 11/1963 Miller ........................ 122/479.1
3,146,759 A * 9/1964 Miller ........................... 122/478

(Continued)

FOREIGN PATENT DOCUMENTS

EP 1 243 565 9/2002
FR 2 480 906 10/1981

OTHER PUBLICATIONS

International Search Report for PCT/FR2005/051118.

(Continued)

*Primary Examiner* — Kenneth Rinehart
*Assistant Examiner* — Jorge Pereiro
(74) *Attorney, Agent, or Firm* — Christopher J. Cronin

(57) ABSTRACT

The invention concerns a method for burning a fuel by means of at least one a burner, each burner comprising two half-assemblies (1, 1') comprising each at least one fuel injecting means (2) associated with a primary oxidant injecting means (3), and at least one secondary oxidant injecting means (4), a first oxidant jet being injected at a first distance from the fuel by the primary injecting means so as to generate a first incomplete combustion, and a second oxidant jet being injected at a second distance (L1), greater than the first distance, from the fuel injecting means so as to generate a second combustion with the remaining fuel of the first incomplete combustion. Said method is characterized in that each half-assembly delivers a combustion power different from the one delivered by the other half-assembly.

10 Claims, 2 Drawing Sheets

U.S. PATENT DOCUMENTS

Figure 1:
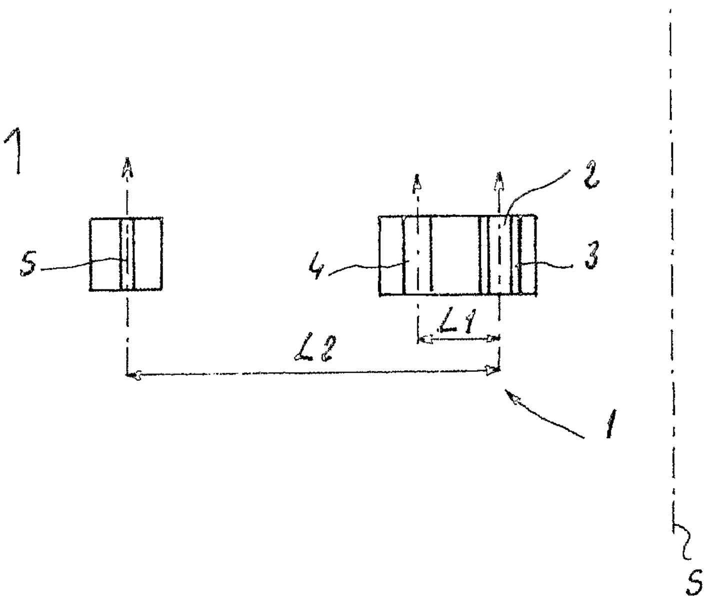

| | | | | |
|---|---|---|---|---|
| 3,202,196 | A * | 8/1965 | Rackley et al. | 122/6.5 |
| 3,401,675 | A * | 9/1968 | Miller | 122/479.1 |
| 3,752,405 | A * | 8/1973 | Vosper et al. | 239/413 |
| 4,194,874 | A * | 3/1980 | Voorheis et al. | 431/8 |
| 4,403,941 | A * | 9/1983 | Okiura et al. | 431/10 |
| 2,480,906 | A | 6/1987 | Takahashi et al. | |
| 4,690,075 | A | 9/1987 | Vidal et al. | |
| 4,730,336 | A * | 3/1988 | Herneisen et al. | 373/2 |
| 4,790,743 | A * | 12/1988 | Leikert et al. | 431/8 |
| 4,810,186 | A * | 3/1989 | Rennert et al. | 431/175 |
| 4,927,357 | A | 5/1990 | Yap et al. | |
| 4,945,841 | A * | 8/1990 | Nakamachi et al. | 110/341 |
| 5,302,112 | A * | 4/1994 | Nabors et al. | 431/8 |
| 5,346,524 | A | 9/1994 | Shamp et al. | |
| 5,431,559 | A * | 7/1995 | Taylor | 431/164 |
| 5,505,146 | A * | 4/1996 | Laursen | 110/264 |
| 5,554,022 | A * | 9/1996 | Nabors et al. | 431/10 |
| 5,611,682 | A * | 3/1997 | Slavejkov et al. | 431/8 |
| 5,809,913 | A * | 9/1998 | Kramer et al. | 110/347 |
| 5,993,193 | A * | 11/1999 | Loftus et al. | 431/8 |
| 6,041,622 | A | 3/2000 | Duchateau et al. | |
| 6,079,229 | A | 6/2000 | Legiret et al. | |
| 6,269,646 | B1 * | 8/2001 | Lovett et al. | 60/737 |
| 6,331,107 | B1 | 12/2001 | Philippe | |
| 6,338,304 | B2 * | 1/2002 | Yamamoto et al. | 110/261 |
| 6,354,110 | B1 * | 3/2002 | Alchalabi et al. | 65/134.4 |
| 6,398,547 | B1 * | 6/2002 | Joshi et al. | 432/54 |
| 6,454,562 | B1 * | 9/2002 | Joshi et al. | 432/17 |
| 6,544,029 | B2 * | 4/2003 | Marin et al. | 431/165 |
| 6,659,762 | B2 * | 12/2003 | Borders et al. | 431/8 |
| 6,715,319 | B2 * | 4/2004 | Barrow et al. | 65/134.9 |
| 6,790,031 | B2 * | 9/2004 | Berg et al. | 431/9 |
| 6,866,501 | B2 * | 3/2005 | Wang et al. | 431/8 |
| 6,910,879 | B2 * | 6/2005 | Dugue et al. | 431/8 |
| 6,979,191 | B1 * | 12/2005 | Zink et al. | 431/174 |
| 7,014,458 | B2 * | 3/2006 | Marin et al. | 431/10 |
| 7,172,412 | B2 * | 2/2007 | Platvoet et al. | 431/9 |
| 2001/0018172 | A1 * | 8/2001 | Lovett et al. | 431/195 |
| 2002/0081544 | A1 * | 6/2002 | Marin et al. | 431/2 |
| 2002/0110505 | A1 * | 8/2002 | Wang et al. | 422/198 |
| 2003/0054301 | A1 * | 3/2003 | Borders et al. | 431/8 |
| 2003/0148236 | A1 * | 8/2003 | Joshi et al. | 431/9 |
| 2003/0170579 | A1 * | 9/2003 | Wang et al. | 431/174 |
| 2004/0142292 | A1 * | 7/2004 | Berg et al. | 431/9 |
| 2004/0157178 | A1 * | 8/2004 | Dugue et al. | 431/10 |
| 2004/0209208 | A1 * | 10/2004 | Wang et al. | 431/8 |
| 2005/0158678 | A1 * | 7/2005 | Wang et al. | 431/174 |
| 2006/0057517 | A1 * | 3/2006 | Joshi et al. | 431/12 |
| 2007/0172781 | A1 * | 7/2007 | Tsiava et al. | 431/10 |
| 2007/0281254 | A1 * | 12/2007 | Leroux et al. | 431/6 |

OTHER PUBLICATIONS

Patent Abstracts of Japan, vol. 1995, No. 4, May 31, 1995 & JP 07 010545.

* cited by examiner

STAGED COMBUSTION METHOD FOR PRODUCING ASYMMETRIC FLAMES

This application is a 371 of International PCT Application PCT/FR2005/051118, filed Dec. 20, 2005.

BACKGROUND

The present invention relates to a staged combustion method for producing asymmetric flames.

The establishment of a combustion system in an industrial furnace designed to bring a charge to a high temperature must ensure efficient heat transfer while preventing damage to the actual structure of the furnace chamber. To this end, the arrangement of the burners must observe several rules and it is necessary, on the one hand, to prevent flames coming from the burners from developing close to a wall of the furnace and, on the other hand, to prevent flames from interacting. Indeed, in this latter case, each flame has the tendency to be raised and to heat the upper wall of the roof, in this way risking considerable damage to the furnace. Most current burners, whether they operate with air, air enriched with oxygen or with pure oxygen as an oxidizer, possess a flame shape that is symmetrical with respect to the axis of the burner. These burners can have a flat flame structure or possess a concentric configuration developing a cylindrical flame. Taking into account the preceding requirements as well as the flame shapes developed by current burners, their arrangement inside the combustion system of the furnace is awkward and generally produces many disadvantages. More precisely, in order to prevent the flames developed by the burners damaging the wall of the furnace, these must be placed at a sufficient distance from the walls concerned. The effective heat transfer area becomes considerably reduced and any increase in the power of the burner risks making this distance insufficient. In addition, in order to prevent the problem of the rise of the flames of two burners positioned opposite each other, it is essential either to ensure that the flame length of each burner does not exceed half the width of the furnace, which limits the maneuvering margin in terms of the power of the burners and risks leading to an unnecessary multiplication of the number of burners, or to arrange the burners in a manner offset from each other, which leads to an operation of the furnace that is no longer symmetrical or uniform.

The object of the present invention is to overcome the previously mentioned disadvantages, and to this end consists of a method for the combustion of a fuel by means of at least one burner, said burner having two semi-assemblies, each comprising:

at least one fuel injection means
a primary oxidizer injection means, and
at least one secondary oxidizer injection means, a first oxidizer jet being injected at a first distance from the fuel by the primary injection means so as to produce an incomplete first combustion, and a second oxidizer jet being injected at a second distance, greater than the first distance, from the means for injecting fuel by the secondary injection means so as to produce a second combustion with fuel remaining from the incomplete first combustion, said method being characterized in that each semi-assembly delivers a different combustion power from that delivered by the other semi-assembly. Thus, by virtue of an unequal distribution of the combustion power between each semi-assembly of the burner, it is possible to create a zone with a high combustion power on one semi-assembly and a zone with low combustion power on the second semi-assembly. This makes it possible to move the active combustion zone, and consequently to modify the geometry of the flame produced, so as to obtain an asymmetric flame. Moreover, the fact of forming an asymmetric flame makes it possible to reduce the risks of overlap, it being possible to regulate each burner so that its flame does not interact with the flame of another burner. Preferably, two semi-assemblies are distributed symmetrically about an axis of symmetry S of the burner.

Advantageously, a third oxidizer jet can be injected at a second distance (L2) greater than the first distance (L1) by a tertiary oxidizer injection means (5). This third oxidizer injection is designed to guarantee sufficient dilution of the reagents before the main combustion zone, so as to limit the formation of thermic NOx compounds.

Preferentially, a different quantity of fuel is injected into the fuel injection means of each semi-assembly. On account of this, the combustion power delivered by each semi-assembly is different, the quantity of fuel delivered by the primary and secondary oxidizer injection means being quite obviously adapted as a consequence according to the fuel flow rate.

According to a particular embodiment, the burner creates a flame close to a wall and the power of the semi-assembly nearest to said wall possesses the smaller combustion power. This wall is generally parallel to the axis of symmetry of the burner, for example when it consists of the charging wall of a furnace. Since the high power zone is away from the walls of the furnace, the risk of damaging these walls is greatly reduced.

The invention also relates to a method for heating a material in a furnace, said furnace being fitted with at least one pair of burners, the burners of said pair being placed face-to-face in the furnace, wherein:

the burners put the combustion method as previously described into practice,
the burners of the pair are arranged in the furnace so that each semi-assembly of a burner is facing a semi-assembly of the other burner of the pair, and
the semi-assembly of the first burner of the pair having the smaller combustion power faces the semi-assembly of the second burner of the pair having the higher combustion power. According to this embodiment, the semi-assemblies of pairs of burners are face-to-face and the semi-assemblies are regulated so that they develop a flame complementary to that developed by the semi-assembly placed opposite. Preferably, for each burner, the combustion power of each semi-assembly is less than 0.8 times the total power of said burner. In this way, the power of the second semi-assembly being equal to the total power reduced by the power of the first semi-assembly, the power of a semi-assembly remains greater than 0.2 times the total power, which prevents problems of a flame that is too short or is unstable. According to a variant, for burners of the same pair, one semi-assembly can operate with a combustion stoichiometry greater than 1 and the semi-assembly placed facing this over-stoichiometric semi-assembly operates with a combustion stoichiometry less than 1. In this variant, the flame generated by the over-stoichiometric semi-assembly generates considerable amounts of soot. Combustion of this unburned matter can then be completed by means of supplementary oxygen provided by the other semi-assembly of the paired burner placed opposite, adjusted as a consequence in order to function with a stoichiometry less than a value of 1.

The invention finally relates to a method for heating a material in a furnace, said furnace being fitted with at least one pair of burners, the burners of said pair being placed face-to-face in the furnace, wherein:

the burners put the combustion method as previously described into practice, the burners of the pair are arranged in the furnace so that for each burner only one of the semi-assemblies faces a semi-assembly of the other burner of the pair, and the semi-assembly of the first burner of the pair having the smaller combustion power faces the semi-assembly of the second burner of the pair having the higher combustion power. According to this embodiment, the semi-assemblies that are placed face-to-face are regulated so that they develop complementary flames. Preferably, for each burner, the combustion power of each semi-assembly is less than 0.8 times the total power of said burner. According to a variant, for burners of the same pair, a semi-assembly can operate with a combustion stoichiometry greater than 1 and the semi-assembly placed facing this over-stiochiometric semi-assembly then operates with a combustion stoichiometry less than a value of 1. In this variant, the flame generated by the over-stoichiometric semi-assembly generates a considerable amount of soot. Combustion of this unburned matter can be completed by means of supplementary oxygen provided by the other semi-assembly placed opposite, regulated as a consequence to operate with a stoichiometry less than a value of 1.

Figure 2:
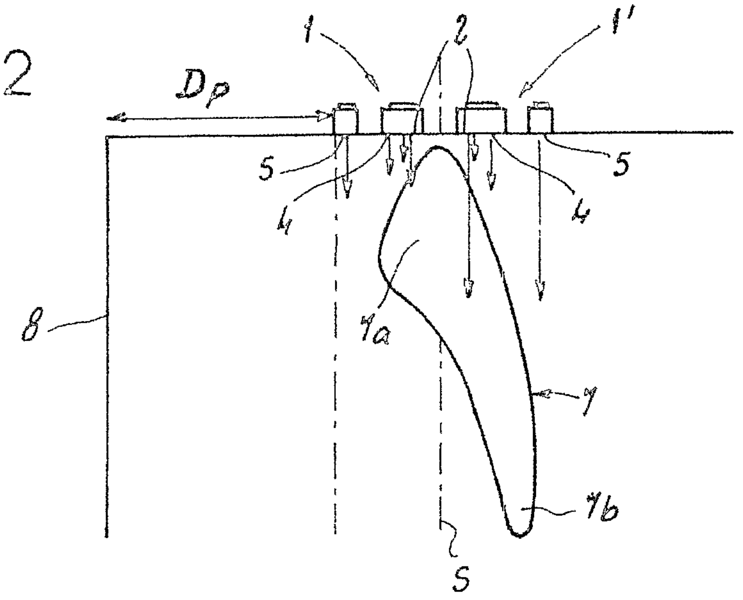
Figure 3:
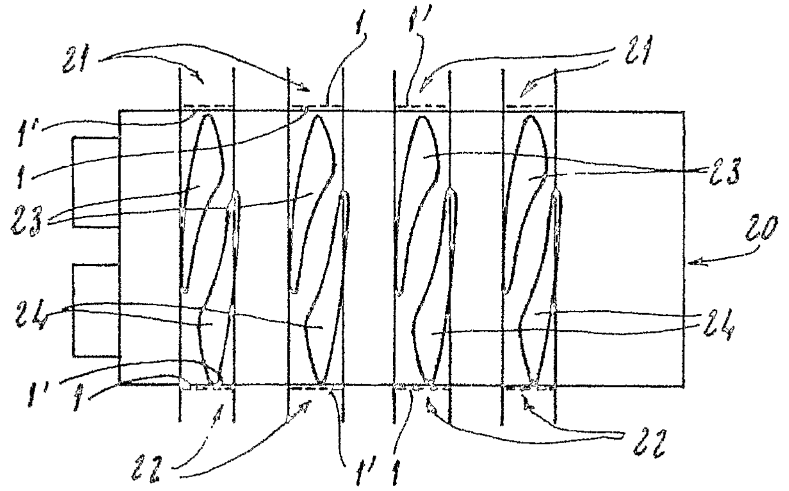
Figure 4:
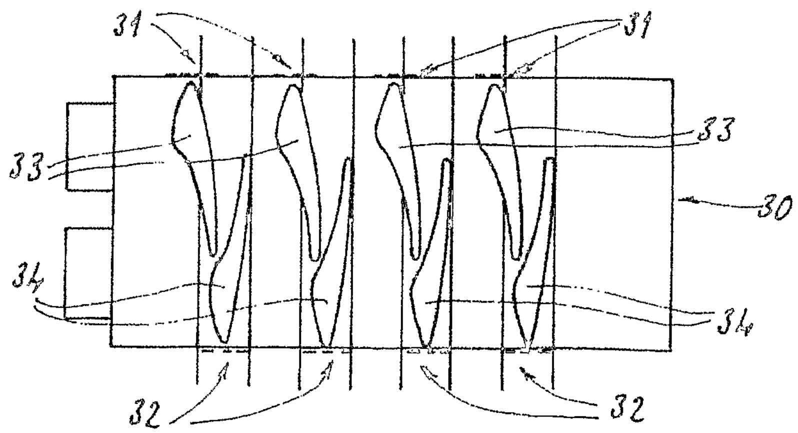

The implementation of the invention will be better understood with the aid of the detailed description that is given below in relation to the appended drawings wherein:

FIG. 1 is a diagrammatic representation of a semi-assembly of a burner according to the invention, FIG. 2 illustrates the operation of the burner of FIG. 1, FIG. 3 is a diagrammatic representation of an industrial furnace using burners positioned face to face, FIG. 4 is a diagrammatic representation of an industrial furnace using burners positioned in an offset manner.

A burner with jets separated according to the invention comprises two semi-assemblies 1, 1', one of which is represented in FIG. 1. Each semi-assembly 1, 1' comprises a fuel supply 2 with which a primary oxidizer supply 3 is associated, in this case of oxygen, situated at a first distance from the fuel supply 2, a secondary oxidizer supply 4 situated at a second distance L1 greater than the first distance from the fuel supply 2, and a tertiary oxidizer supply 5 situated at a third distance L2, greater than the second distance L1, from the fuel supply 2. The fuel used can be in gaseous form or liquid form, this being if need be sprayed by a suitable atomizing system. More precisely, the tertiary oxidizer supply 5 is situated at a relatively large distance from the fuel supply 2 and is used to inject oxygen with a high velocity. This arrangement makes it possible to guarantee sufficient dilution of the reagents before the main combustion zone, in this way preventing the formation of too great a quantity of thermic NOx compounds.

In operation, as represented in FIG. 2, each sub-assembly 1, 1' is distributed symmetrically about an axis of symmetry S, it being possible for each fuel supply 2 and oxidizer supply 3, 4, 5 to be regulated independently for flow rate. Each semi-assembly 1, 1' is regulated so that the structural symmetry is broken in order to obtain an asymmetric flame. To this end, the flow rates of the fuel supplies 2 and oxidizer supplies 3, 4, 5 are regulated differently. In the event, the flow of fuel delivered for the semi-assembly 1 is regulated so as to be less than the flow rate of fuel delivered by the semi-assembly 1'. The primary 3, secondary 4 and tertiary 5 supplies are consequently regulated with respect to the fuel supply 2 of the sub-assembly 1, 1' concerned. The flow rates of reagents are represented symbolically by an arrow with a variable length. As represented, the combustion power of the semi-assembly 1' is greater than the combustion power of the semi-assembly 1, on account of this generating an asymmetric flame 7 possessing a length in the region of the sub-assembly 1' clearly less than its length in the region of the sub-assembly 1. The flame 7 then has a lean zone 7*a* in the region of the sub-assembly 1 and a rich zone 7*b* in the region of the sub-assembly 1'. Obtaining such an asymmetric flame 7 makes it possible to reduce the necessary distance Dp between the burner and the wall 8 of the furnace so as to prevent damaging the latter. Minimum heat transfer to a charge to be heated is therefore guaranteed towards the charge situated close to the wall 8 of the furnace, preventing the formation of hot spots on said wall 8.

In a similar manner, the asymmetric flame 7 makes it possible to prevent flames coming from the burners situated face to face from interacting together.

FIG. 3 shows a furnace 20 comprising an assembly of burners 21, 22 as defined in FIGS. 1 and 2, positioned in pairs facing each other. Each burner 21, 22 is regulated so that it develops an asymmetric flame 23, 24, with a complementary shape to the flame 24, 23 coming from the paired burner 22, 21. In this way, any flame overlap is prevented, thereby reducing risks of damaging the furnace 20. As a variant, the power distribution as previously described can be achieved by keeping or not a combustion stoichiometry close to the value 1 for each semi-assembly 1,1'. In the case of stoichiometries that are different from a value of 1, the semi-assembly with the greater power is regulated with a combustion stoichiometry less than 1 while the semi-assembly operating at a lower power will be regulated with a combustion stoichiometry greater than the value of 1. This regulation makes it possible to obtain a rich zone generating soot on the semi-assembly of the burner 21, 22, combustion of unburned materials being completed by means of supplementary oxygen provided by the semi-assembly of the paired burner 22, 21.

FIG. 4 shows a furnace 30 comprising an assembly of burners 31, 32 as described in FIGS. 1 and 2, arranged in pairs facing each other but in an offset manner, that is to say so that only one semi-assembly of the burner 31 faces a semi-assembly of the burner 32. The burners 31, 32 are regulated so that they develop an asymmetric flame 33, 34 having a lean zone 33*a*, 34*a* and a rich zone 33*b*, 34*b*. More precisely, the burners 31, 32 are regulated so that the rich zone 33*b* is situated in the region of the lean zone 34*a*, the rich zone 34*b* overlapping the rich zone 33*b*. This arrangement is particularly advantageous in the case of burners 31, 32 operating with a combustion stoichiometry different from a value of 1. In point of fact, in the case where the semi-assembly 1' of the burner 31 is regulated with a combustion stoichiometry less than a value of 1, the rich zone 33*b* of the asymmetric flame 33 generates considerable amounts of soot. Combustion of this unburned matter can then be completed by means of supplementary oxygen provided by the semi-assembly 1 of the paired burner 32, regulated as a consequence in order to operate with a stoichiometry less than a value of 1.

Another variant (not shown) of a burner according to the invention differs from a burner 1, 21, 22, 31, 32 only by the fact that regulation of the power of the semi-assembles 1, 1' is carried out by varying the distance L1 between the secondary oxidizer supply 4 and the fuel supply 2 on each semi-assembly 1, 1'. In point of fact, a shorter distance L1 will give rise to more powerful combustion while a longer distance L1 will reduce the combustion power simply from the fact of greater dilution of the oxidizer before this reaches the combustion zone. Regulation of each semi-assembly 1, 1' by varying the distance L1, can obviously be combined with regulation by varying the flow rate of the reagents previously described.

Although the invention has been described in connection with particular examples of embodiments, it is quite obvious that it is in no way limited thereto and it comprises all technical equivalents of the means described as well as combinations thereof if these fall within the scope of the invention.

What is claimed is:

1. A method for the combustion of a fuel by means of a burner, said burner having two semi-assemblies, each semi-assembly comprising:

a) at least one fuel injection means;

b) a primary oxidizer injection means; and c) at least one secondary oxidizer injection means, said method comprising the steps of:

injecting a first oxidizer jet at a first distance from the fuel by the primary injection means so as to produce an incomplete first combustion, and injecting a second oxidizer jet at a second distance from the means for injecting fuel by the secondary injection means so as to produce a second combustion with fuel remaining from the incomplete first combustion, said second distance being greater than the first distance, wherein:

each semi-assembly delivers a different combustion power from that delivered by the other semi-assembly;

the two semi-assemblies are distributed symmetrically about an axis of symmetry S; and the first combustion and second combustion of each of said two semi-assemblies forming a flame that is asymmetric with respect to said axis of symmetry S.

2. The method of claim 1, wherein a third oxidizer jet is injected at a third distance greater than the first distance by a tertiary oxidizer injection means.

3. The method of claim 1, wherein a different quantity of fuel is injected into the fuel injection means of each semi-assembly.

4. The method of claim 1, wherein the burner creates a flame close to a wall and in that the power of the semi-assembly nearest to said wall possesses the smallest combustion power.

5. A method for heating a material in a furnace, said furnace being fitted with at least one pair of burners, the burners of said pair being placed face-to-face in the furnace, each of said burners having first and second semi-assemblies, each of said first and second semi-assemblies comprising at least one fuel injection means, a primary oxidizer injection means, and at least one secondary oxidizer injection means, said method comprising the steps of:

injecting a first oxidizer jet at a first distance from the fuel by the primary injection means so as to produce an incomplete first combustion; and injecting a second oxidizer jet at a second distance from the means for injecting fuel by the secondary injection means so as to produce a second combustion with fuel remaining from the incomplete first combustion, said second distance being greater than the first distance, wherein:

a) for each of said burners, the first semi-assembly delivers a lower combustion power from that delivered by the second semi-assembly;

b) the burners of the pair are arranged in the furnace so that each semi-assembly of a burner is facing a semi-assembly of the other burner of the pair; and c) the first semi-assembly of the first burner of the pair faces the second semi-assembly of the second burner of the pair.

6. The method of claim 5, wherein, for each burner, the combustion power of each semi-assembly is less than 0.8 times the total power of said burner.

7. The method of claim 5, wherein, for burners of the same pair, the second semi-assembly operates with a combustion stoichiometry greater than 1 and the first semi-assembly placed facing this over-stoichiometric semi-assembly operates with a combustion stoichiometry less than 1.

8. A method for heating a material in a furnace, said furnace being fitted with at least one pair of burners, the burners of said pair being placed face-to-face in the furnace, each of said burners having first and second semi-assemblies, each of said first and second semi-assemblies comprising at least one fuel injection means, a primary oxidizer injection means, and at least one secondary oxidizer injection means, said method comprising the steps of:

injecting a first oxidizer jet at a first distance from the fuel by the primary injection means so as to produce an incomplete first combustion; and injecting a second oxidizer jet at a second distance from the means for injecting fuel by the secondary injection means so as to produce a second combustion with fuel remaining from the incomplete first combustion, said second distance being greater than the first distance, wherein:

a) for each of said burners, the first semi-assembly delivers a lower combustion power from that delivered by the second semi-assembly;

b) the burners of the pair are arranged in the furnace so that, for each burner, only one of its semi-assemblies faces a semi-assembly of the other burner of the pair; and c) the first semi-assembly of the first burner of the pair faces the semi-assembly of the second burner of the pair.

9. The method of claim 8, wherein, for each burner, the combustion power of each semi-assembly is less than 0.8 times the total power of said burner.

10. The method of claim 8, wherein, for the burners of the same pair, the second semi-assembly operates with a combustion stoichiometry greater than 1 and the first semi-assembly placed facing this over-stoichiometric semi-assembly operates with a combustion stoichiometry less than 1.

* * * * *